Feb. 18, 1969 O. C. MOLL 3,427,721

LAYOUT SYSTEM AND ATTACHMENTS FOR FLEXIBLE COILED TAPES

Filed March 29, 1966

3,427,721
LAYOUT SYSTEM AND ATTACHMENTS FOR FLEXIBLE COILED TAPES

Oswin C. Moll, 1640 Chippendale Circle, Bethlehem, Pa. 18017

Continuation-in-part of application Ser. No. 418,163, Dec. 14, 1964. This application Mar. 29, 1966, Ser. No. 538,414
U.S. Cl. 33—1 1 Claim
Int. Cl. G01b *3/14, 5/24;* G06g *1/00*

ABSTRACT OF THE DISCLOSURE

A tool for determining the layout of work to be performed having a pair of detachable retractable tapes which are mounted on a pair of pivotally connected protractors.

This application is a continuation-in-part of application Ser. No. 418,163 filed Dec. 14, 1964, now Patent No. 3,242,578.

This invention relates to a combination layout tool employing a coilable flexible metal measuring tape. The invention is particularly directed to various coupling means for the tape and the tape housing, the coupling means providing a versatile, compact layout system.

Flexible tapes are used by carpenters, plumbers, installers of floorings, ceilings, partitions, etc., in order to accurately determine the layout of the work they are performing. When only one tape is used, it is necessary for the workmen to move about and mark dimensions step-by-step. This frequently results in inaccuracies, due to human errors, but more particularly the errors arise because the working area is irregular and dimensions must be taken and transferred in several different directions. It is also quite common for dimensions to be required in several different planes on one particular job. The use of the conventional tape means is therefore tedious and in many cases not completely reliable.

The present invention utilizes a conventional coiled flexible tape that is of concave/convex cross-section and provides several easily attachable coupling means. The tapes may be joined together in various combinations so that dimensions may be transferred at different angles and in different planes. Means are provided for joining several tapes end to end, transversely to each other, at an angle to each other in one plane or at an angle to each other in two or more planes. An important feature of this invention is the compactness of the attachment members. Without materially adding to the size of the tape itself, measurements up to 100 feet may easily be transferred.

It is therefore an object of this invention to provide improved coupling means for coiled flexible metal tapes.

It is another object to provide a number of different types of coupling means for the aforementioned tapes whereby a complete layout system is achieved.

A particular object is to provide protractor type coupling means for the aforementioned tapes whereby the angular relationship between the tapes may be readily determined.

A further object is to provide protractor type coupling means for the aforementioned tapes whereby the angular relationship between tapes in two or more different planes may be readily determined.

Still another object is to provide coupling means for intersecting tapes of the aforementioned type.

A particular object is to provide coupling means to join the ends of the aforementioned tapes, the coupling means being adapted for use with colinear tapes as well as tapes at an angle to each other.

Another object is to provide means whereby tapes may be coupled in two different planes.

Yet another object is to provide coupling means to simultaneously accommodate three tapes, each in a different plane.

A further object is to provide an improved end fitting for a flexible tape.

Yet another object is to provide end to end coupling of flexible tapes whereby the tapes and the coupling may be recoiled into the tape housing.

These and other features, objects and advantages of the invention will, in part, be pointed out with particularity and will, in part, become obvious from the following more detailed description of the invention, taken in conjunction with the accompanying drawing, which forms an integral part thereof.

In the various figures of the drawing like reference characters designate like parts.

Figure 1:
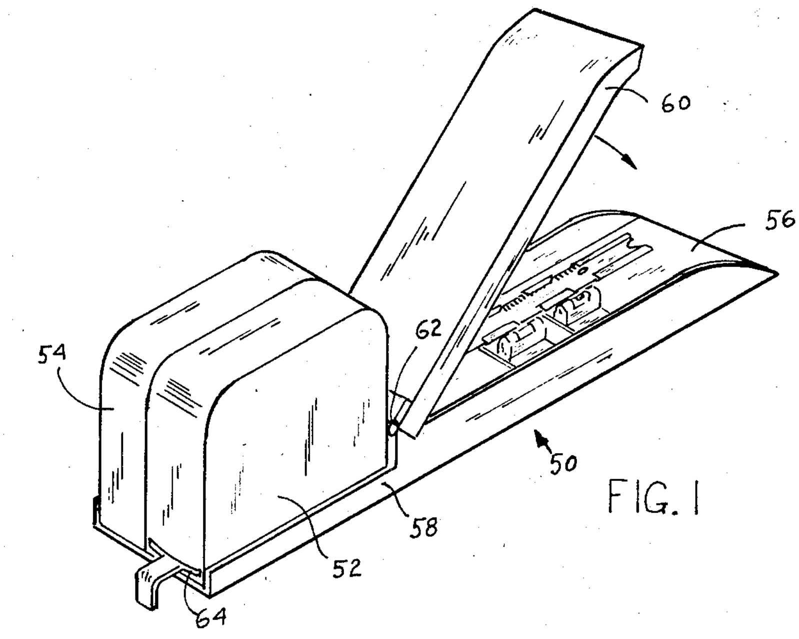
FIG. 1 is a perspective view of a housing member arranged to support a pair of flexible tapes and to provide storage means for coupling members.

Referring now to FIG. 1, a container 50 is shown supporting tape housings 52 and 54 in side by side relation. The housing is comprised of a base portion 56 having a pair of parallel upstanding sidewalls 58. Cover member 60 is removably positioned over the sidewalls 58 to define a storage compartment for some of the components that will be described later. Hinge pin 62 secures the cover to the base portion so that access may be easily had to the storage compartment. The tape housings are removably retained in the container by suitable retaining means such as detents, spring latches, etc. In the embodiment illustrated in FIG. 1, the slot 64 for the withdrawal of the tape in member 52 is shown facing to the left. Member 54 has a similar slot which is not visible because it is facing in the opposite direction; that is, into the storage area. A tape may be withdrawn in either of two opposite directions. Thus there has been described coupling means for two tape housings in combination with storage means.

Figure 2:
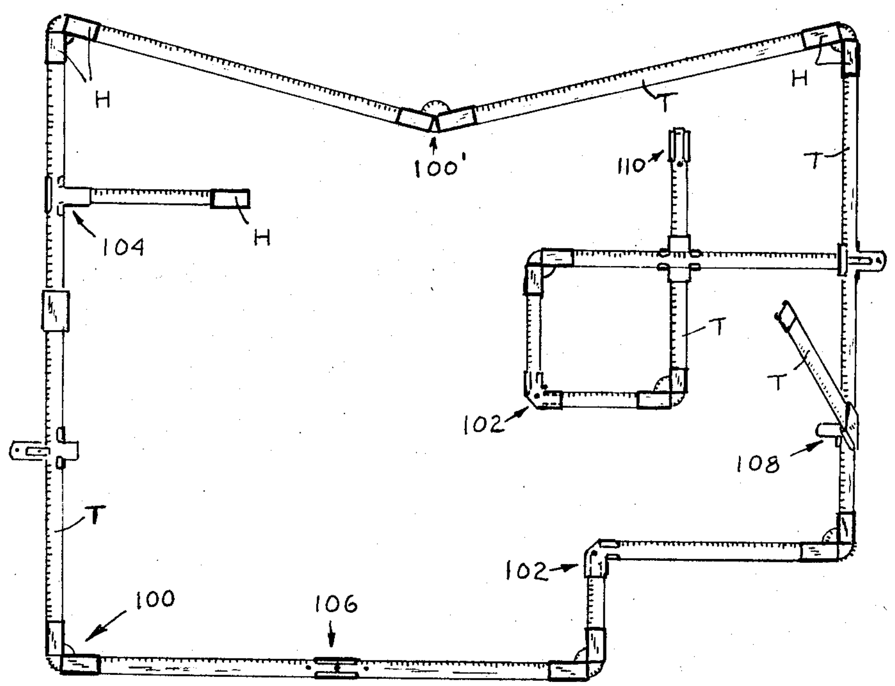
FIG. 2 is a schematic plan view of a complete layout system employing various tape coupling means of this invention.

FIG. 2 is a plan view of a number of elements which comprise the layout system of this invention. As will be described, the system is comprised of a number of flexible tapes T together with housings H therefor and means to couple the tapes and/or their housings. Corners may be accurately marked by means of right angle couplings 100. The couplings may either be adjustably positioned at 90°, or they may be comprised of fixed members 102 that are fabricated to accurately couple a pair of tapes at 90° with respect to each other. Where the adjustable couplings are used, it is to be understood that other angles may also be established, such as shown at 100'. Other means to position one tape at right angles to another is shown at 104. Where tapes are to be coupled end to end, means such as 106 may be used. Dimensions may be accurately established into two planes by means of coupling members similar to 108. Finally, end fittings such as 110 may be used where the distance from an obstruction must be accurately determined.

Figures 3, 4, 5, 6:
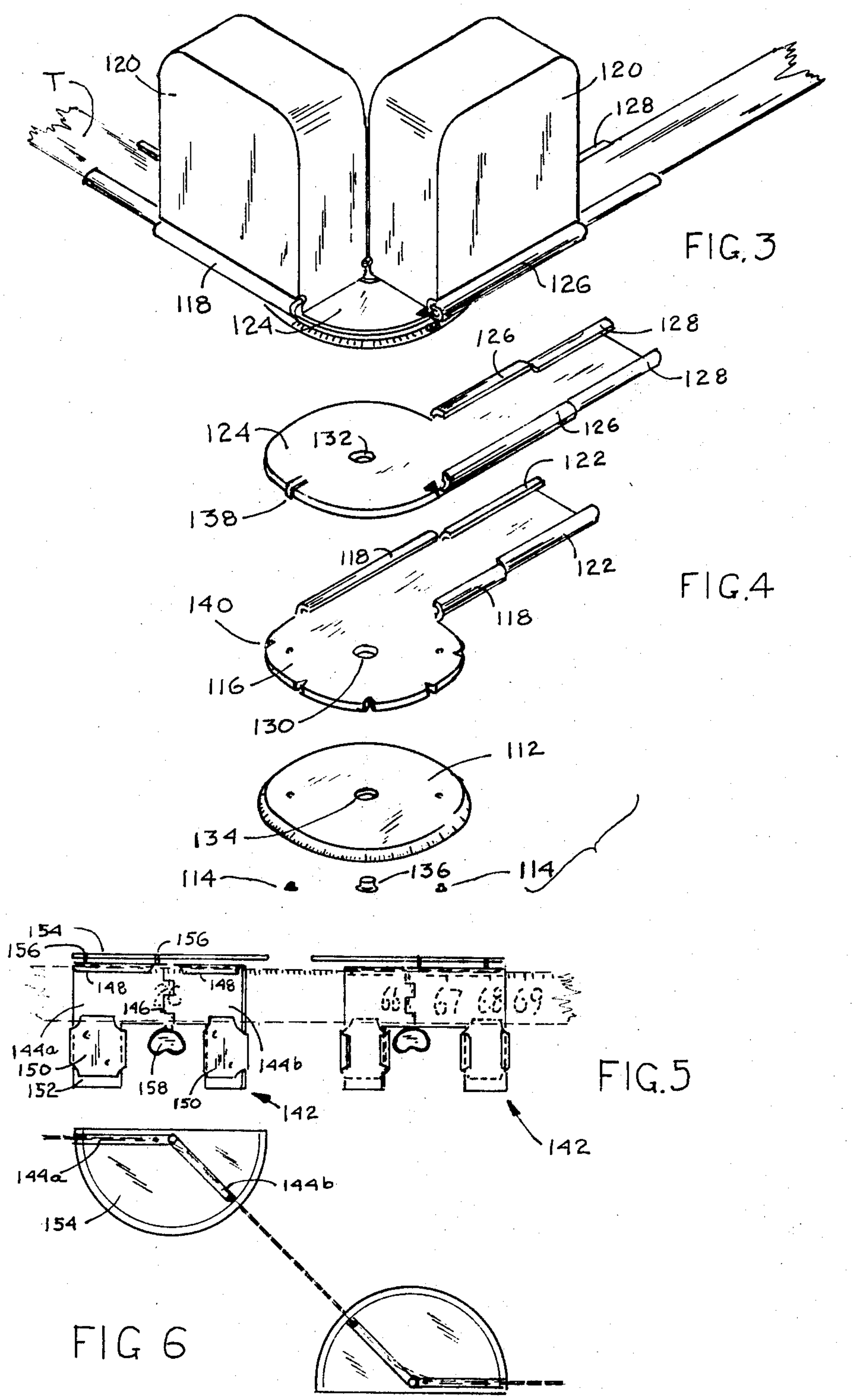
FIG. 3 is a perspective view of protractor coupling means for single plane dimension transfer.
FIG. 4 is an exploded perspective view of the components comprising the embodiment of FIG. 3.
FIG. 5 is an elevational view of protractor type coupling means employed in the transfer of dimensions in two different planes.
FIG. 6 is a plan view of the protractor type coupling means shown in FIG. 5.

Referring now to FIGS. 3 and 4, the construction of an angularly adjustable coupling means will be described. A protractor 112 is secured, for example, by means of rivets 114 to the underside of plate 116. A first pair of parallel channels 118 is spaced from each other to receive the base of the tape housing 120. Preferably, the tape housing includes a longitudinal groove on each side to receive the channel members. Although this is not absolutely essential, this construction does serve to accurately locate the housing with respect to the protractor. A second pair of spaced parallel channels 122 is contiguous with the first pair of channels, the second pair of channels serving as a guide track for aligning the tape as it is pulled from the housing.

A second plate 124 is provided with a similar first pair of channels 126 and a second pair of channels 128.

Both plates 116 and 124 have central apertures 130 and 132, respectively, and the protractor is provided with an aperture 134. Thus a single rivet 136 extending through central aperture 137 in the protractor joins three elements whereby the first plate is fixedly secured to the protractor and the second plate is angularly movable with respect to the first plate. Suitable detents or a tongue 138 on plate 124 adapted to fit into notches 140 on plate 116, corresponding to the 45, 90 and 135° makings on the protractor, may also be included.

It will be apparent that if a pair of tape housings is secured to the channel members described above, the accurate layout of a 90° corner such as shown in FIG. 2 may easily be made. It is also evident that by positioning the tape housings at any other protractor setting, it will also result in the very accurate determination of an angle other than 90°.

Whereas, the coupling means just described has utility for measuring an angle in one plane, the coupling means now to be described is useful for measuring and laying out angles in two different planes. As shown in FIGS. 5 and 6, coupling means 142 is comprised of two clips **144*a* and 144*b* that may be slidably mounted on a length of flexible tape and which are secured to each other by hinge member 146. The clips are each provided with a flange 148 which serves to slidably retain them on the tape. Thumb latches 150 are slidably mounted on extensions 152 of the clips to provide retaining means for the edge of the tape opposite to clip members 148. A protractor 154 is removably mounted on pins 156 which are integral with clip 144*a*. Finally, a thumb screw 158**, which also serves as the hinge pin, is used to lock the coupling means at a specific point on the tape.

Because the tape is flexible, coupling means 142 may be positioned at the desired point on the tape, for example, at the 26-inch marker, and the tape bent so that it coincides with the 46° calibration on the protractor. Another coupling means 142 may be positioned at another point on the tape; for example, at the 66¼ inch mark, and a tape again bent, this time at a 45½° angle. Thus, the angular as well as the linear relationship between the coupling means can easily be determined. The settings can be made as accurately as both the protractor and the tape can be read. Typically, a protractor can be read directly to half a degree and estimated to a quarter degree. The tape can easily be read directly to one-sixteenth of an inch and estimated to 1/32 of an inch.

The protractor measurement may be used in conjunction with a precalculated table to determine the length of conduit that must be provided for making a bend. The table would provide a list of conduit sizes normally employed, the angle of the bend to be made and the length of conduit needed for a particular number of degrees of radius. The operator, knowing the angle involved, can, by reference to the table, make due allowance for the excess conduit needed for the curve. In cutting the conduit provision may be made for the bend lengths.

Figure 7:
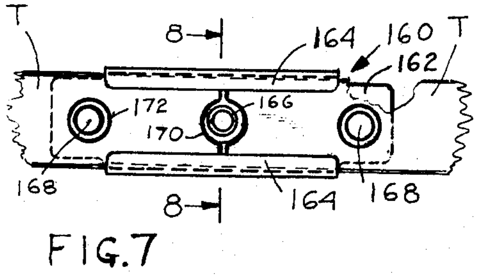
FIG. 7 is a plan view of end to end tape coupling means.
Figure 8:
FIG. 8 is a sectional side elevational view taken along line 8—8 of FIG. 7.

FIGS. 7 and 8 illustrate means for coupling tapes in an end to end relationship. Coupling means 160 is comprised of a flat central base section 162, the sides of which are formed into opposed channels 164. A boss in the form of a hollow rivet 166 is centrally provided, as is a protrusion 168 at each end of the base section 162. The tapes T have a reinforced semi-circular aperture 170 and a reinforced hole 172 inward of the end thereof. The tapes may be secured to each other in an end to end relationship by sliding members 160 on to the end of each tape, until semi-circular aperture 170 abuts rivet 166. At that time protrusion 168 will fall into aperture 172 to securely lock the tape in place. This may be done with two opposed tapes, or, alternatively, the fitting may be only half of that shown and be useful with only one tape. The central aperture in either case would be equivalent to the zero point of the tape.

Figure 9:
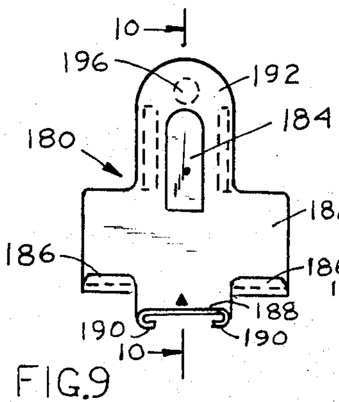
FIG. 9 is a front elevational view of means for coupling three flexible tapes, each of which is in a different plane.
Figure 10:
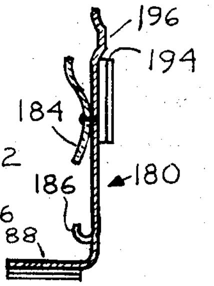
FIG. 10 is a side elevational view of the coupling means shown in FIG. 9.

Referring now to FIGS. 9 and 10, there is shown coupling means 180 for three flexible tapes, each of which is disposed in a different plane. Body portion 182 has on the face thereof a latch member 184 and two spaced tabs 186. One edge of a length of tape is adapted to fit into the two spaced tabs 186. The other opposite edge of the tape fits under latch member 184. Leg 188 is formed outwardly from body member 182 and has a pair of opposed clip members 190 arranged to receive the side edges of a second flexible tape that is in a plane to right angles to the first tape. Extension 192 is in the same plane and is contiguous with body member 182 and is provided with a pair of opposed clips 194 on the rearward surface thereof. Clips 194 receive the edges of still a third tape that is at right angles to both the first and second tapes described above. A boss 196 formed on extension 192 can be used to provide means to seat an aperture included with the tape to prevent the tape from being pulled outwardly.

Figure 11:
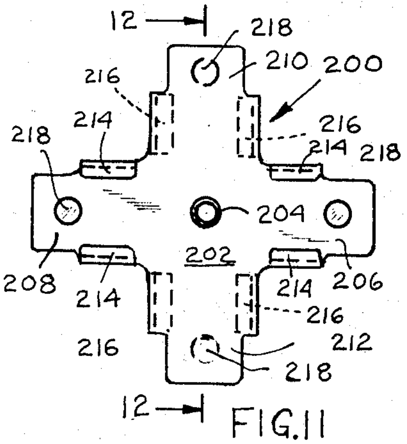
FIG. 11 is a plan view of end coupling means for four tapes in a common plane.
Figure 12:
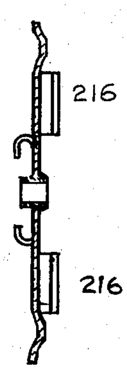
FIG. 12 is a sectional side elevational view taken along line 12—12 of FIG. 11.

FIGS. 11 and 12 illustrate coupling means 200 for holding four tapes, all in the same plane, and at right angles to each other. Body portion 202 is provided with a central boss 204 which is conveniently in the form of a hollow rivet. Legs 206, 208, 210 and 212 extend outwardly from the central portion of the body, the legs being at right angles to each other in a single plane. Opposed legs 206 and 208 each have a pair of clip members 214 formed integrally therewith and positioned above the surface of the respective legs. Similarly, legs 210 and 212 have clip members 216 formed integrally therewith, these last mentioned clip members being disposed below or on the opposite surface of the body. Finally, in each leg, at the end thereof, an aperture 218 is provided. It will be seen that the end of four different flexible tapes may be inserted under each pair of clip members until the end abuts the central boss 204. An aperture in the tape, as described above, will register with boss 218 to prevent inadvertent removal of the tape .

Figure 13:
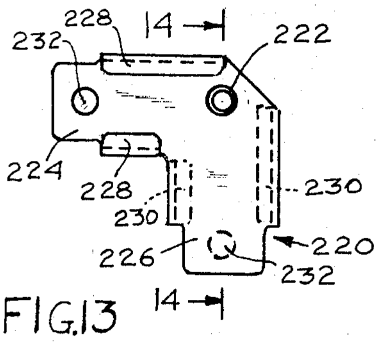
FIG. 13 is a plan view of the right angle end coupling means for two tapes in a common plane.
Figure 14:
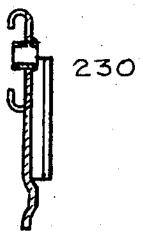
FIG. 14 is a sectional side elevational view taken along line 14—14 of FIG. 13.

The coupling member shown in FIGS. 13 and 14 is functionally the same as the last described embodiment. However, it is used only when two tapes are to be retained at right angles to each other. Coupling member 220 is provided with a boss 222 in the form of a hollow eyelet. The boss is at the juncture of the longitudinal center line of legs 224 and 226, the legs being disposed at right angles to each other in a single plane. Leg member 224 is provided on one surface thereof with clip members 228 to receive the end of a first flexible tape. Leg member 226 has its clip members 230 formed on the opposite surface to receive the second tape. Finally, bosses 232 are stamped at the end of each leg to register with a aperture that is used near the end of each tape. As in the previous embodiments, the extreme ends of the tape on assembly abut boss 222, permitting the bosses to be snapped into the apertures 232.

Figure 15:
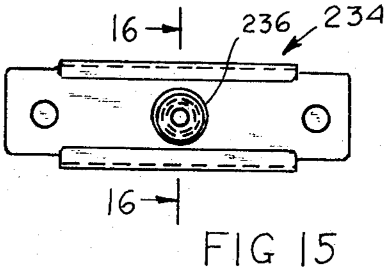
FIG. 15 is a plan view of an end fitting for a single tape.
Figure 16:
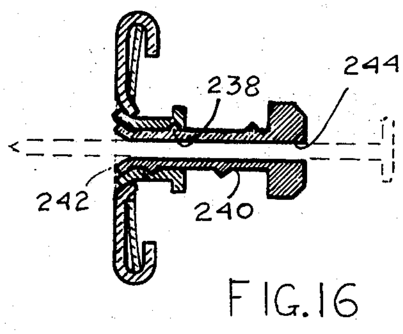
FIG. 16 is a sectional side elevational view taken along line 16—16 of FIG. 15.

FIGS. 15 and 16 illustrate means with which two tapes are coupled end to end and wherein the point of abutment is used as the dimensional reference line. The coupling member 234 is similar to that shown in FIGS. 7 and 8. However, in this embodiment central boss 236 is a hollow elongated rivet that stands upwardly from the top surface of the coupling member. The internal diameter of the rivet is threaded as shown at 238 in order to receive the threaded outside diameter of hollow post 240. This coupling member may be used in either of two manners. The post member may be threaded into the boss whereby the flared bottom end 242 extends beyond the bottom surface of the coupling member. The extension of the post may be inserted into the aperture of a floor, wall or other surface upon which measurements are being made, in order to removably retain the coupling member. Alternatively, the threaded post may be backed off until the bottom end thereof is substantially flush with the outer side of the tape, as shown in FIG. 16. A nail or other suitably pointed article may be inserted in the central aperture 244 of the post, the nail being used as the marker for the dimensional reference.

Figure 17:
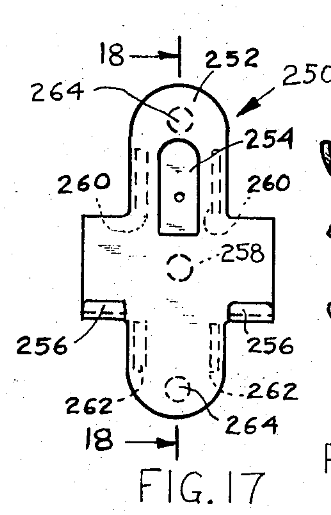
FIG. 17 is a plan view of coupling means for one through tape and two tape ends.
Figure 18:
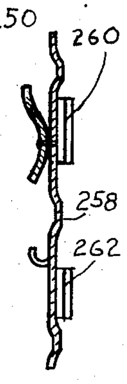
FIG. 18 is a side elevational view of the device shown in FIG. 17.

A coupling member 250, adapted to hold one "through" tape and two tape ends, is shown in FIGS. 17 and 18. Coupling member 250 is comprised of a body portion 252 having two longitudinal axes at right angles to each other in a single plane. Clip members 256 is secured to one surface of the coupling body on one longitudinal axis. A pair of clip members 256 spaced from each other and parallel to the second longitudinal axis, is formed on the same surface as latch 254. In combination, these three elements provide means for retaining the opposed edges of a flexible tape that goes completely through the coupling member. In the rearward surface of the body portion a boss 258 is formed at the juncture of the two perpendicular axes. There is also provided on the same surface two pairs of spaced opposed clip members 260 and 262, both of which are positioned parallel to latch member 254 and also on a common axis. Bosses 264 are formed near the ends of the legs that contain clip members 262. Thus, two colinear tapes may be assembled to the coupling member by having the ends thereof abut boss 258. Apertures in the tape register with bosses 264 to prevent the tapes from being removed.

Figure 19:
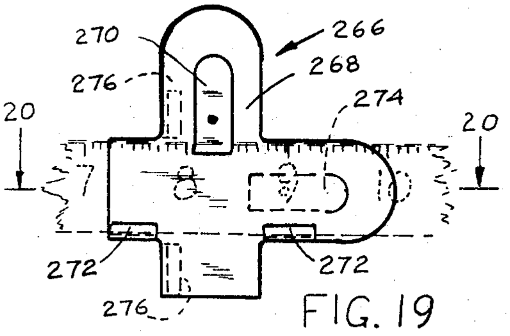
FIG. 19 is a plan view of coupling means for two through tapes.
Figure 20:
FIG. 20 is a sectional side elevational view taken along line 20—20 of FIG. 19.

FIGS. 19 and 20 illustrate right angle coupling means for two through tapes. As in the last mentioned embodiment, coupling member 266 is provided with a body portion 268 having two intersecting and perpendicular axes. A first latch member 270 is formed on one surface of the body portion on one of the axes. Clip members 272 are opposed to the latch members, are spaced from each other and are parallel to the second axes. On the reverse side of the body member a second latch member 274 is positioned on the axes parallel to clip members 272 and perpendicular to latch 270. A second pair of clip members 276 is also formed on the second surface of the coupling member, the clip members 276 being parallel to the axes on which latch 270 is located and perpendicular to the axes on which latch 274 is located. It will be seen, then, that a tape may be retained by latch member 270 and clips 272, while a second tape at right angles thereto is retained by latch member 274 and clips 276.

Figure 21:
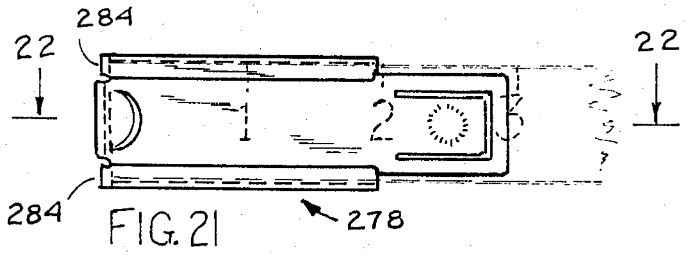
FIG. 21 is a plan view of an alternative end fitting.
Figure 22:
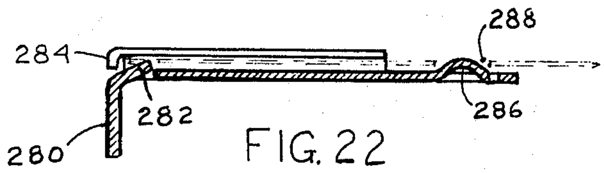
FIG. 22 is a sectional side elevational view taken along line 22—22 of FIG. 21.

Referring now to FIGS. 21 and 22, there is shown a terminal fitting 278 which is provided with a downwardly turned end portion 280. The zero point of the tape coincides with the downwardly turned end. Just to the right of end 280, as seen in FIGS. 21 and 22, there is provided an upwardly formed tongue 272 arranged to engage the arcuate end of the tape to provide positive stop means therefor. In addition, tabs 284, also formed proximate the end of the fitting, serve to accurately position the tape with respect to the downwardly turned end 280. The tape is positively held in the end fitting by means of a protrusion 286 formed upwardly proximate the opposite end of the fitting. Protrusion 286 is arranged to fit into an aperture 288 in the tape when the tape is assembled to the fitting.

Figure 23:
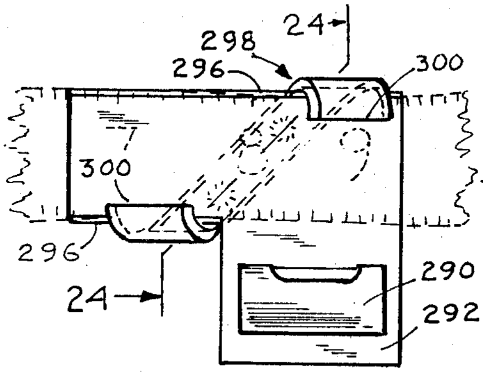
FIG. 23 is a plan view of coupling means for two colinear tapes and an attachment therefor.
Figure 24:
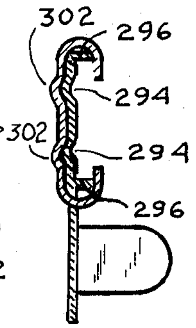
FIG. 24 is a sectional elevational view taken along line 24—24 of FIG. 23.

FIGS. 23 and 24 illustrate simple yet effective means of securing an attachment to any convenient place on the tape. In the embodiment illustrated the attachment is a bubble level 290 that is mounted on a base 292. The base, which has downwardly formed protrusions 294 and upwardly extending parallel legs 296, is placed underneath the tape with the edges of the tape disposed between legs 296. An S-shaped clip member 298 is slidably moved along the tape utnil the inwardly turned integral clips 300 engage the top of legs 296. Movement of the S-shaped clip member slightly deforms the tape so that it is securely held, in addition to which the clip is provided with detents 302 to receive the apertures 294 of the attachment. Thus, the attachment is positively locked and firmly retained in place. While a bubble level has been shown, it is apparent that other attachments, such as a plumb line, could just as easily be secured to a tape at any desired point.

Figure 25:
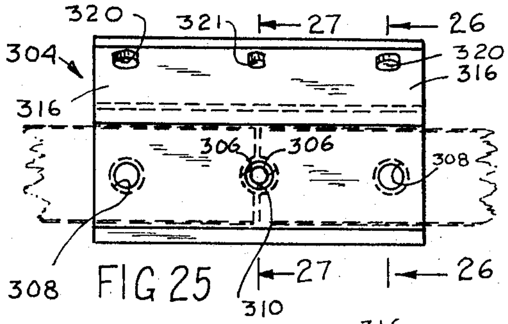
FIG. 25 is a plan view of flexible means to couple the ends of two colinear tapes.
Figure 27:
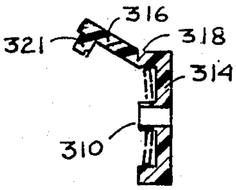
FIG. 27 is another sectional side elevational view taken along line 27—27 of FIG. 25.
Figure 26:
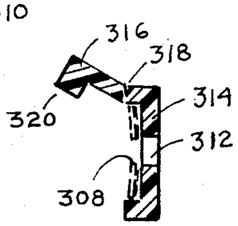
FIG. 26 is a sectional side elevational view taken along line 26—26 of FIG. 25.

FIGS. 25, 26 and 27 show means for providing end to end coupling of two flexible tapes. This coupling member 304 is intended to be retracted into the tape housing when the tape is recoiled. Each tape is provided with an arcuate end portion 306 and an aperture 308. Arcuate ends 306 of the tape abut a hollow central boss 310 provided in the clip member 304. The apertures 308 in the assembled condition register with apertures 312 formed in base wall 314 of the coupling member. In addition, cover portion 316 is hingedly connected at 318 to the base portion of 314 and is provided at the ends thereof with integral studs 320, which may be forced into registered apertures 308 and 312. Central stud 321 in cover portion 316 is arranged to engage the hollow boss 310. In this manner the two colinear tapes are coupled end to end. Coupling means 304 may be made from a thin flexible plastic material, such as polypropylene, whereby the two colinear tapes, together with the coupling means, may be recoiled into the tape housing as a unit.

Figure 28:
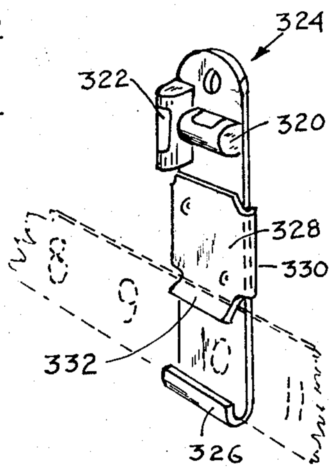
FIG. 28 is a perspective view of slidable fitting retaining means.

Still another attachment means is shown pictorially in FIG. 28. Again, bubble levels 320 and 322 are used by way of illustration. As shown, the levels are at right angles to each other to indicate parallelism with horizontal and vertical axes. Attachment means 324 has an inwardly turned clip portion 326 at one end thereof. Intermediate the levels and the clip there is provided a slidable clip member 328 having opposed side portions 330 arranged to engage the sides of the attachment means. The inner end of member 328 is provided with a tab portion 332 that is parallel and in opposition to clip member 326 whereby, when the slide member 328 is pushed towards the tape, members 326 to 332 will engage the side edges of the tape.

Having thus disclosed the best embodiment of the invention presently contemplated, it is to be understood that various changes and modifications may be made by those skilled in the art without departing from the spirit of the invention.

What is claimed is:

1. A layout tool comprising a first plate, a second plate, a pivot member interconnecting portions of said first and second plates, a rectractable rule housing mounted on a free end portion of each of said plates, and means on each of said plates for releasably securing said housing to said plates and for positioning said housings so that an edge portion of a rule on each of said housing is in alignment with the axis of said pivot member.

References Cited

UNITED STATES PATENTS

| | | | |
|---|---|---|---|
| 1,033,061 | 7/1912 | Cane | 33—2 |
| 1,101,140 | 6/1914 | Morrison | 33—2 |
| 2,230,668 | 2/1941 | Ohrtmann | 33—138 |
| 2,591,333 | 4/1952 | Bellmer | 33—137 |
| 3,066,416 | 12/1962 | Gutting | 33—1 |
| 3,095,651 | 7/1963 | Luedicke | 33—138 X |
| 3,269,015 | 8/1966 | Barker | 33—138 |

FOREIGN PATENTS

| | | |
|---|---|---|
| 991,887 | 5/1965 | Great Britain. |

WILLIAM D. MARTIN, Jr. *Primary Examiner.*

U.S. Cl. X.R.

33—75, 138, 173